United States Patent
Krall et al.

(10) Patent No.: US 6,730,257 B2
(45) Date of Patent: May 4, 2004

(54) SHUTTLE-TYPE BLOW MOLDING METHOD AND APPARATUS

(75) Inventors: Thomas J. Krall, Toledo, OH (US); Gregory A. Geisinger, Toledo, OH (US)

(73) Assignee: Owens-Brockway Plastic Products Inc., Toledo, OH (US)

( * ) Notice: Subject to any disclaimer, the term of this patent is extended or adjusted under 35 U.S.C. 154(b) by 522 days.

(21) Appl. No.: 09/781,656

(22) Filed: Feb. 12, 2001

(65) Prior Publication Data

US 2002/0109271 A1 Aug. 15, 2002

(51) Int. Cl.[7] .................. B29C 49/04; B29C 49/24
(52) U.S. Cl. ............... 264/509; 264/540; 425/532; 425/538
(58) Field of Search ................ 264/509, 540; 425/532, 538, 539, 540

(56) References Cited

U.S. PATENT DOCUMENTS

| | | |
|---|---|---|
| 3,396,427 A | 8/1968 | Raspante |
| 3,614,807 A | 10/1971 | Lagoutte |
| 3,998,576 A | 12/1976 | Frohn et al. |
| 4,248,582 A | 2/1981 | Martin, Jr. |
| 4,601,869 A | 7/1986 | Harry et al. |
| 4,616,992 A | 10/1986 | Oles |
| 4,679,997 A | 7/1987 | Plenzler et al. |
| 4,769,205 A | 9/1988 | Oles et al. |
| 5,098,279 A | 3/1992 | Effenberger et al. |
| 5,284,432 A | 2/1994 | Wurzer |
| 5,576,034 A | 11/1996 | Kiefer et al. |
| 5,681,596 A * | 10/1997 | Mills et al. ............... 425/532 |
| 5,855,838 A | 1/1999 | Weber et al. |
| 5,976,452 A * | 11/1999 | Meyer ............... 264/542 |
| 6,471,907 B1 * | 10/2002 | Krall et al. ............... 264/509 |

FOREIGN PATENT DOCUMENTS

| | | |
|---|---|---|
| DE | 1930 075 | 12/1970 |
| DE | 1940 483 | 2/1971 |
| DE | 3830117 A1 | 3/1990 |
| EP | 0 666 162 A1 | 1/1995 |
| GB | 2 255 929 A | 7/1991 |
| JP | 10024485 | 1/1998 |
| WO | WO 01/23164 A1 | 4/2001 |

* cited by examiner

*Primary Examiner*—Suzanne E. McDowell

(57) ABSTRACT

Shuttle blow molding apparatus having an extruder for substantially continuously extruding a thermoplastic material in tubular form at a moldable temperature downwardly along a vertical axis. A first finite length of the thermoplastic material is grasped by a first mold set, which then moves outwardly and downwardly with respect to the extruder to provide clearance for a second mold set to move to a position to grasp a second finite length of the extruded thermoplastic tube. The first mold set is then moved horizontally away to permit the finite length of thermoplastic tube therein to be blown into a hollow article, and thereafter removed from the first mold set at a second position of the first mold set. The second mold set, after grasping a second finite length of the extruded thermoplastic tube, moves outwardly in a direction opposed to the direction of movement of the first mold set away from the extruder and downwardly to permit the extruded length of thermoplastic tube therein to be blown into a hollow article, and thereafter removed from the second mold set at the position where the hollow articles are removed from the first mold set.

14 Claims, 5 Drawing Sheets

SHUTTLE-TYPE BLOW MOLDING METHOD AND APPARATUS

FIELD OF THE INVENTION

This invention relates to a method of, and apparatus for, blow molding hollow articles of a thermoplastic material. More particularly, this invention relates to a method of, and apparatus for, blow molding hollow containers of a thermoplastic material.

BACKGROUND OF THE INVENTION

The production of thermoplastic containers by shuttle blow molding is described, for example, in U.S. Pat. No. 3,614,807 (Lagoutte). In shuttle blow molding, two or more sets of blow molds, each of which is made up of a pair of mold halves that open and close relative to each other, are moved, in sequence, to engage an extruded tube of thermoplastic material at a moldable temperature, or a spaced apart plurality of such tubes in equipment used to simultaneously manufacture a plurality of containers in each mold set. Each mold set is then moved away to a station where the portion of the tube in the mold set is blown into its desired configuration, as determined by the configuration of a cavity that is defined by the halves of the mold set, the movement of each mold set according to the aforesaid '807 patent involving a first motion coaxial with the extruded tube to stretch the tube to properly size it and/or to axially orient material therein. The halves of the mold set are then opened to permit removal of the blown article, and the mold set is then returned to grasp another section of the extruded tube or tubes for a repeat of the process. The mold sets of a given shuttle blow molding machine move in predetermined paths relative to one another so that sequential portions of the extruded tube are usually grasped by one or another of the mold sets, without the need to employ intermittent extrusion of the thermoplastic tube or tubes.

In the manufacture of containers by shuttle blow molding it has become popular to apply labels to the containers, by introducing a label or an opposed pair of labels into the open molds before the parison(s) are engaged thereby, by equipment that applies labels to the interiors of the open mold halves, and this equipment is generally described as in-mold labelling equipment. Known types of in-mold labelling equipment have the capacity to feed labels to the mold sets of a shuttle blow molding machine at a rate equal to the total of the production rates of all mold sets of the shuttle blow molding machine. Unfortunately, however, some of the known types of shuttle blow molding machines position the various mold sets at different positions from one another while containers are being blown therein. This, then, requires an in-mold labelling machine for each mold set, notwithstanding that the total capacity of the multiple in-mold labelling machines for a given shuttle blow molding machine far exceeds the molding capacity of all the mold sets of the machines. The use of an in-mold labelling device in connection with a shuttle blow molding machine is described, for example, in U.S. Pat. No. 4,769,205 (Oles et al.) and in U.S. Pat. No. 5,919,498 (Weber). Further, an in-mold labelling device in connection with an injection blow molding machine is described in commonly assigned U.S. Pat. No. 4,808,366 (Kaminski et al.), the disclosure of which is incorporated by reference herein.

Another disadvantage of known types of shuttle blow molding machines that applies even when the machine is not being used to apply labels to the containers in the mold is that article removal equipment must be provided for each mold set, because the article removal positions of the various mold sets differ from one another. A shuttle blow molding machine that employs four (4) mold sets is described in International Patent Application Serial No. PCT/US00/26497. However, there are many shuttle blow molding operations that do not require the full productive capacity of a four-mold machine.

SUMMARY OF THE INVENTION

Shuttle blow molding apparatus according to the present invention is made up of an extruder that continuously extrudes a tube of thermoplastic material of a suitable temperature for blow molding into a useful article, or a plurality of spaced apart tubes of such material, or blow head that continuously produces parisons of containers of such material. Such apparatus is particularly useful in producing containers for use in various packaging applications. In any case, the shuttle blow molding apparatus of the present invention also includes a pair of mold sets, or a superimposed plurality of pairs of mold sets, each set being made up of an opposed pair of mold halves that close and open with respect to each other, and the inside surfaces of the mold halves are configured so that the mold halves, when closed, define a cavity, or a plurality of cavities in the case of apparatus having a multi-tube extruder, in which an article is blown from a length of extruded tube to conform to the configuration of a cavity.

The shuttle blow molding apparatus of the present invention also includes apparatus for moving each mold set, in sequence, to an elevated position in which it grasps a length of extruded tube and then outwardly in a first transverse direction and downwardly to permit the other mold set to engage another length of extruded tube. The other mold set, with length(s) of extruded tube therein, is then also moved outwardly, in a second, oppositely directed direction, and also downwardly. The length(s) of extruded tube in each mold set is blown during movement of the mold set through a closed path back to its tube grasping position, which is the same for each mold set, for the start of another production cycle.

In moving back to their common tube grasping positions, the mold sets first move along spaced apart parallel horizontal paths to positions horizontally spaced from their tube grasping positions, and the lengths of extruded tubes in the mold sets are blown into containers or other hollow articles during this movement. At the conclusion of these horizontal movements, which occur at different times for each mold set, each mold set is then moved upwardly and inwardly to position it for return movement to its extruded tube grasping position. At the conclusion of this upward and inward movement, which sequentially positions each mold set at a common position, the mold set is opened and the container (s) therein removed, before return of the mold set to its tube grasping position. Thus, a single article take-out device can be used to withdraw blown containers from both mold sets because each mold set, in sequence, is at the same position for container removal. When it is desired to practice in-mold labelling with apparatus according to the present invention, it is only necessary to position a single in-mold labelling device at the tube grasping position of the mold sets to insert a label, or an opposed pair of labels, sequentially, into the mold sets while the halves of the mold set are still open and before length(s) of extruded tube(s) are grasped by the mold set.

Accordingly, it is an object of the present invention to provide an improved method of, and apparatus for, producing hollow articles of a thermoplastic material in a pair of mold sets that move, in sequence, in closed, quadrilateral paths relative to an extruder, each quadrilateral path having the same extruded tube engaging position and the same blown article removing position, but otherwise having different positions.

More particularly, it is an object of the present invention to provide a method and apparatus of the foregoing character in which finished articles can be removed from each of the mold sets at only a single position. It is also an object of the present invention to provide a method and apparatus of the foregoing character in which labels can be applied to the interiors of the open mold sets at a single location prior to the blowing of severed lengths of extruded tube into containers in the mold sets.

For a further understanding of the present invention and the objects thereof, attention is directed to the drawing and the following brief description thereof, to the detailed description of the invention and to the appended claims.

DETAILED DESCRIPTION OF THE INVENTION

Figure 1:
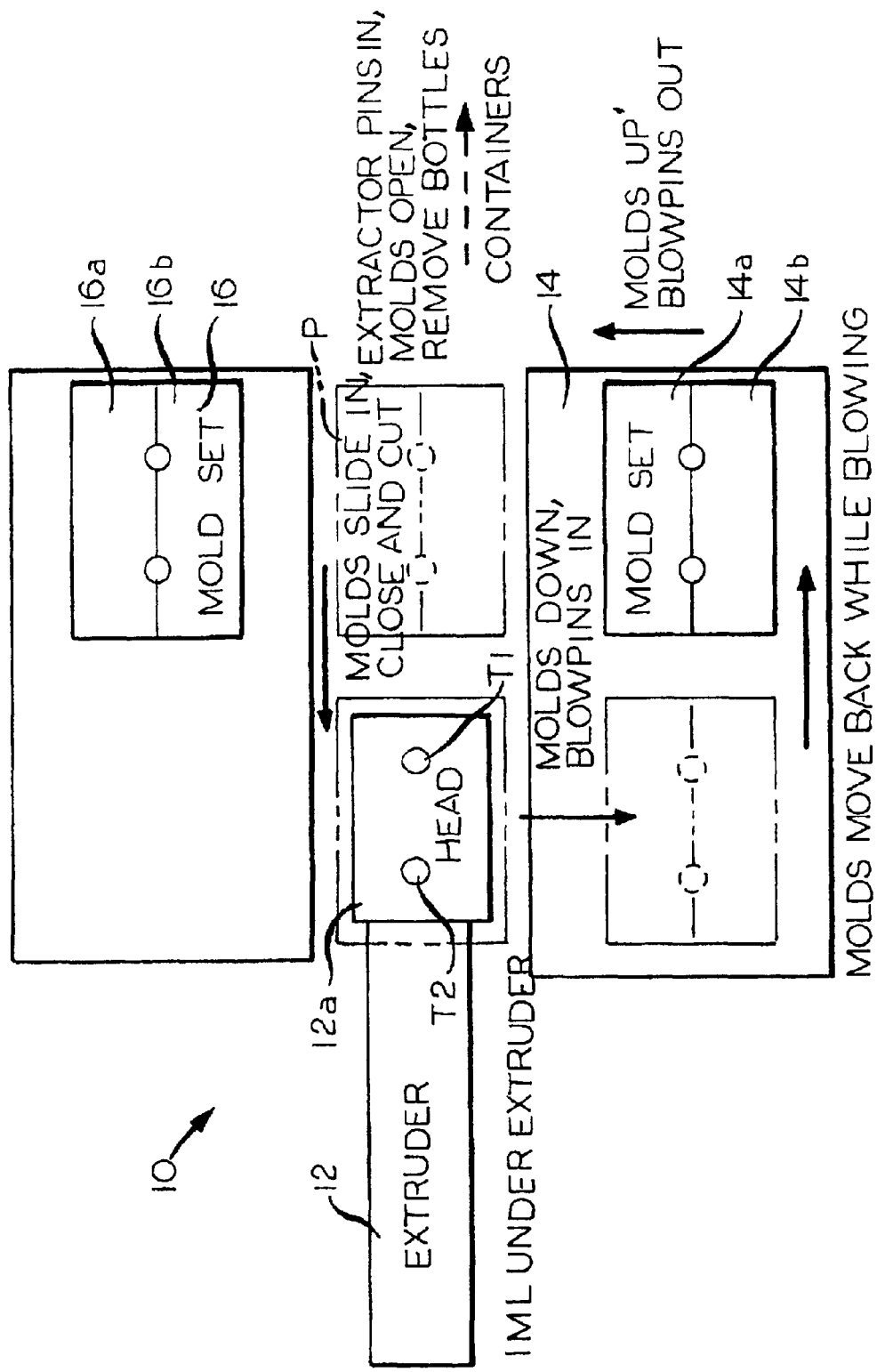
FIG. 1 is a schematic plan view of apparatus according to the present invention for practicing a method according to the present invention.
Figure 2:
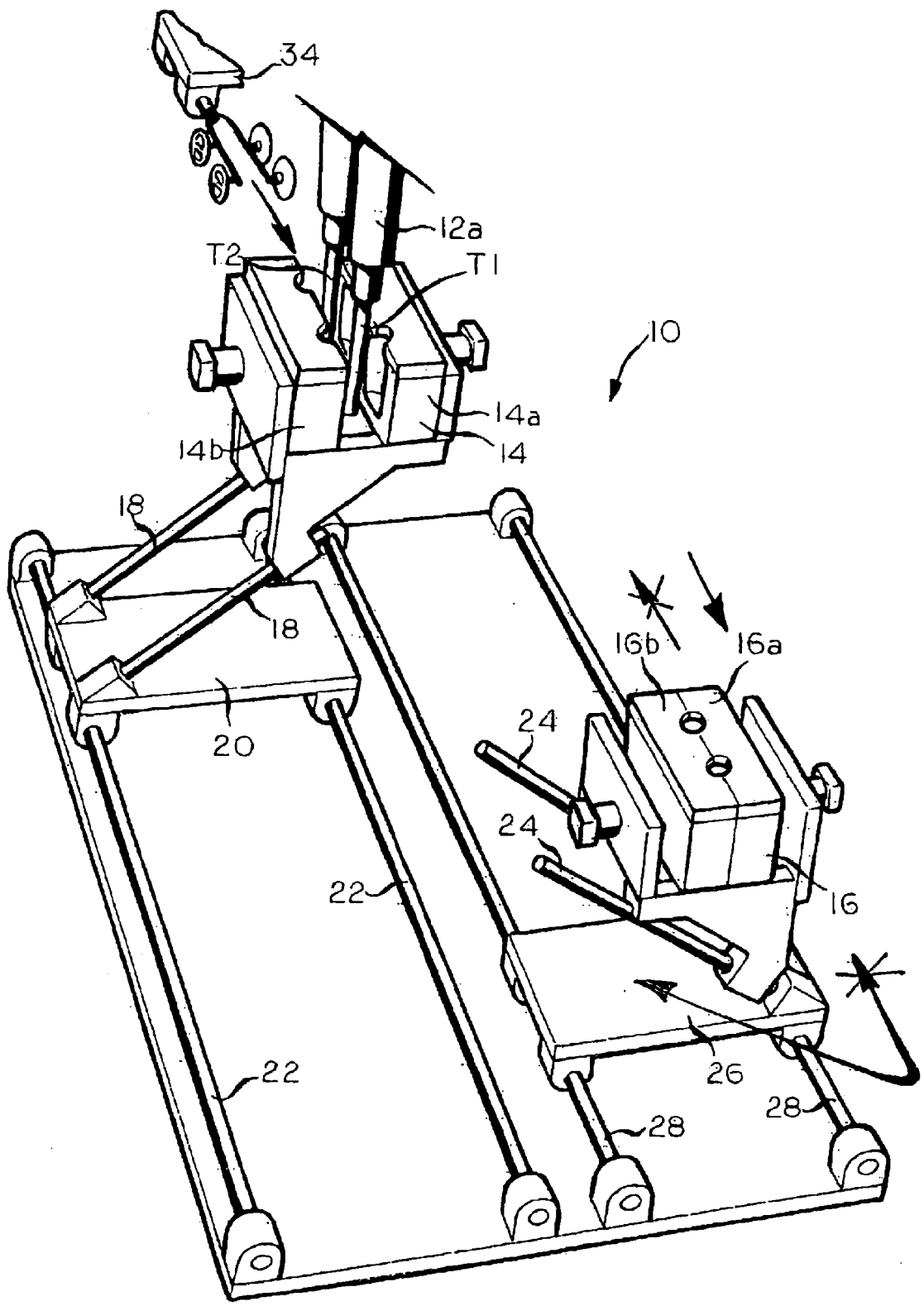
FIG. 2 is a perspective view of apparatus according to FIG. 1 at a step in the practice of the method of the present invention.

Shuttle blow molding apparatus according to the present invention is indicated generally by reference numeral 10 in FIGS. 1–4. The apparatus 10 includes an extruder 12 that substantially continuously downwardly extrudes a spaced apart pair of tubes T1, T2 of thermoplastic material at a temperature sufficiently high to permit finite lengths of each such tube to be blown into containers or other useful hollow articles. The blowing of successive lengths of each of the tubes T1, T2 is done sequentially by a pair of mold sets 14, 16, which may be of conventional construction. Each mold set 14 is made up of a pair of mold halves 14a, 14b, which open and close with respect to one another to define, when closed, mold cavities in which lengths of the tubes T1, T2 are blown into the desired articles. Likewise, each mold set 16 is made up of a pair of mold halves 16a, 16b, which open and close with respect to one another to define, when closed, mold cavities in which successive lengths of the tubes T1, T2 are blown into the desired articles. While the simultaneous molding of articles from tubes T1, T2 is described, it is to be understood that it is contemplated that the apparatus 10 can be used to produce only one article at a time from a single extruded tube, or multiple articles from each tube, and to produce one or more articles at a time from each of three or more extruded tubes.

The mold set 14 is mounted on a pair or spaced apart, inclined slides 18 for movement outwardly and downwardly from a position beneath the extruder head 12a, and the slides 18 are mounted on a shuttle 20. The shuttle 20 is mounted for movement in a horizontal plane on a pair of spaced apart slides 22 from a position aligned in a vertical plane with an extruder head 12a to a position horizontally removed therefrom.

The mold set 16 is mounted on a pair of spaced apart, inclined slides 24 for movement outwardly and downwardly from a position beneath the extruder head 12a, which it occupies after the departure of the mold set 14 from such position, and the slides 24 are mounted on a shuttle 26. In that regard, the outward movement of the mold set 16 from beneath the extruder head 12a is opposed in direction to the outward movement of the mold set 14 from a position beneath the extruder head 12a. In any case, the shuttle 26 is mounted for movement in a horizontal plane on a pair of spaced apart slides 28 from a position aligned in a vertical plane with the extruder head 12a to a position horizontally removed therefrom.

Figure 3:
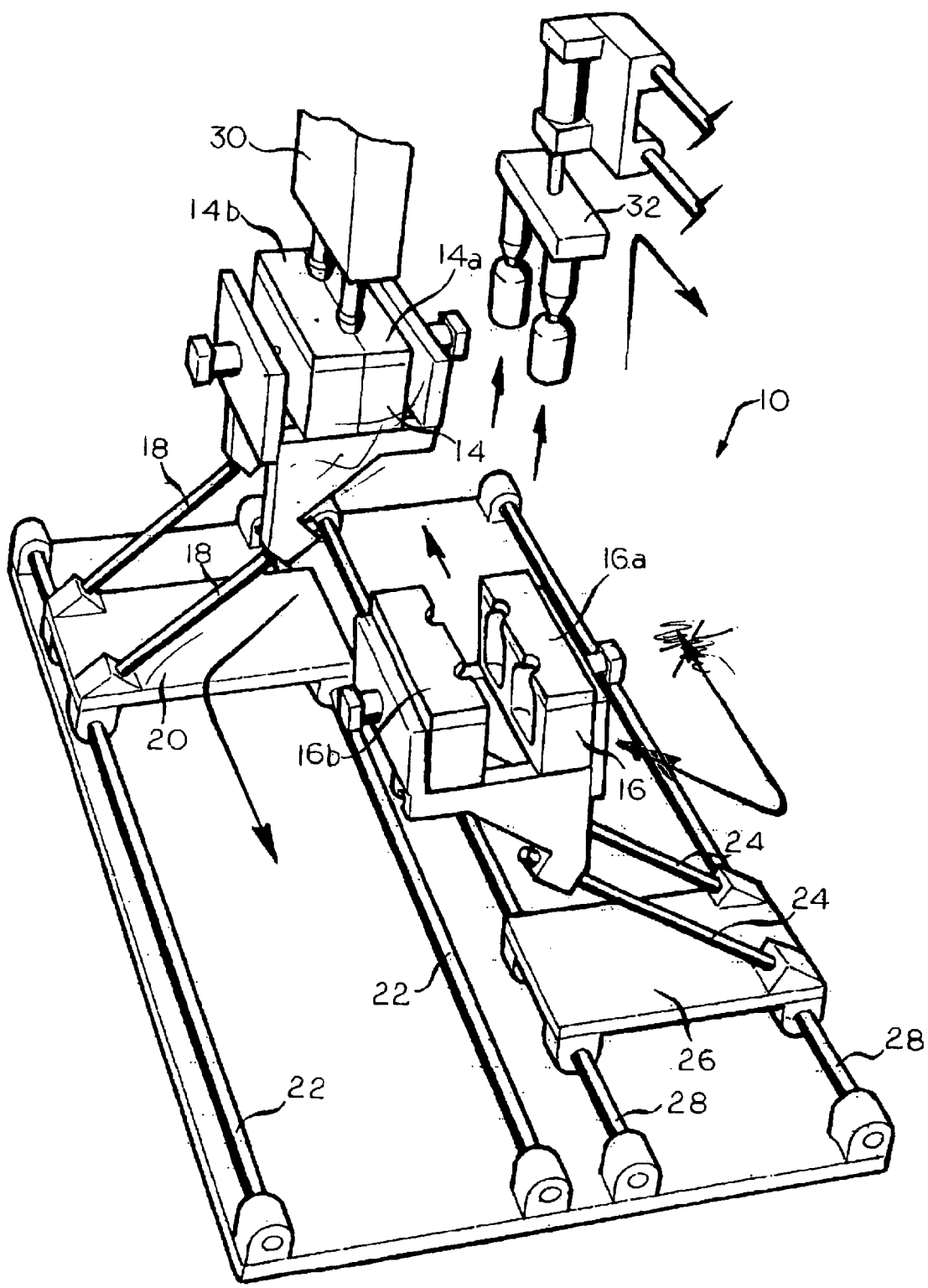
FIG. 3 is a perspective view of the apparatus of FIG. 2 at a later step in the practice of the method of the present invention.
Figure 4:
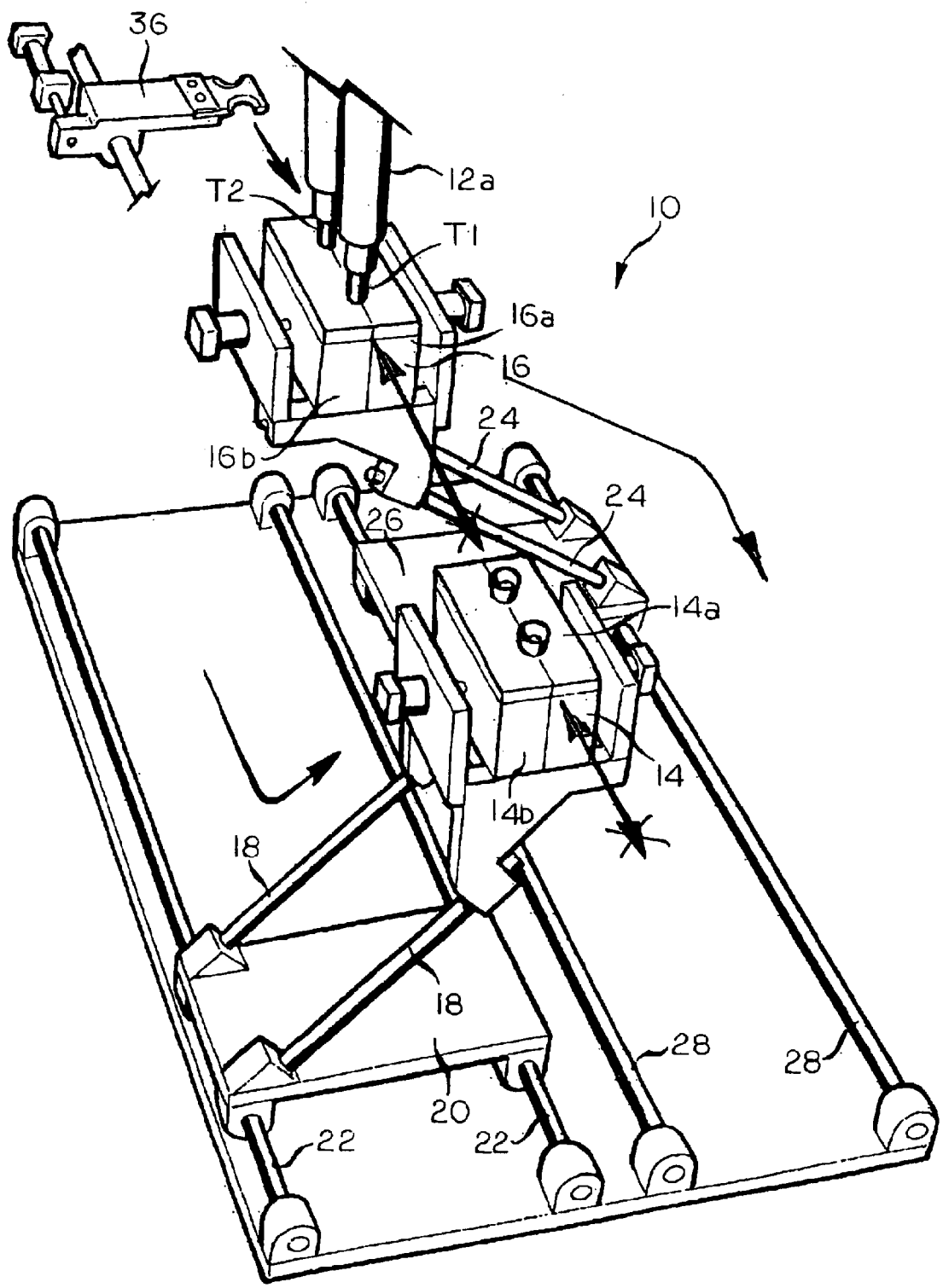
FIG. 4 is a perspective view of the apparatus of FIGS. 2 and 3 at an even later step in the practice of the method of the present invention.

After each of the mold sets 14, 16 receives and closes around lengths of extruded tubes T1, T2, a blow head, shown in FIG. 3 as the blow head 30 for the mold set 14, aligns itself with the lengths of the tubes T1, T2 therein. The blow head 30 travels with the mold set 14 as the mold set 14 moves rearwardly with the shuttle 20, and injects blowing air or other fluid into the lengths of the tubes T1, T2 in the closed mold set 14 to blow such lengths into finished articles.

When or shortly after the mold sets 14, 16 reach their rearmost positions on the slides 22, 28, respectively, the blow head associated therewith is removed therefrom and such mold sets 14, 16 are then sequentially moved upwardly and inwardly on the slides 18, 24, respectively, to a take-out position, shown as the position P in FIG. 1. A take-out device 32 engages the blown containers or other articles in the mold sets 14, 16, and then the mold sets 14, 16 are opened and the articles are removed therefrom. As is clear from FIG. 1, the position P is the same for each of the mold sets 14, 16, which allows for the use of a single take-out device 32 for both of the mold sets 14, 16. Further, the position P is away from a position beneath the extruder head 12a, for a mason which will be subsequently described in more detail. In any case, the shuttle 20 or the shuttle 26, on which the mold set 14 or the mold set 16 is mounted, is then moved toward a position beneath the extruder head 12a to begin a repeat of the cycle in connection with subsequent finite lengths of the extruded tubes T1, T2.

When it is desired to prelabel containers being produced by the blow molding apparatus 10, an in-mold labeling device 34 is provided to introduce a label, or an opposed pair of labels, into the mold sets 14, 16 while the mold halves 14a. 14b or 16a, 16b are in a position beneath the extruder head 12a, but while such mold sets are still open. In that regard, an in-mold labeling device in connection with a shuttle blow molding machine is described, for example, in U.S. Pat. No. 4,769,205 (Oles at al.). In any case, it is important that the position at which labels are introduced into the mold sets 14, 16, be different from the position P at which articles are removed from the mold sets 14, 16, to minimize problems in trying to position multiple devices at the same position on the blow molding apparatus 10.

If it is desired to positively sever lengths of the extruded tubes T1, T2 from successive positions of such tubes, a retractable cut-off knife 36 (FIG. 4) is provided to sever the tubes T1, T2 after lengths thereof have been positively grasped by the mold set 14 or mold set 16, as the case may be. In any case, the downward movement of the mold sets 14, 16 during the outward movement of its mold sets aids in severing the grasped lengths of the tubes T1, T2 from the portions above such grasped lengths.

Figure 5:
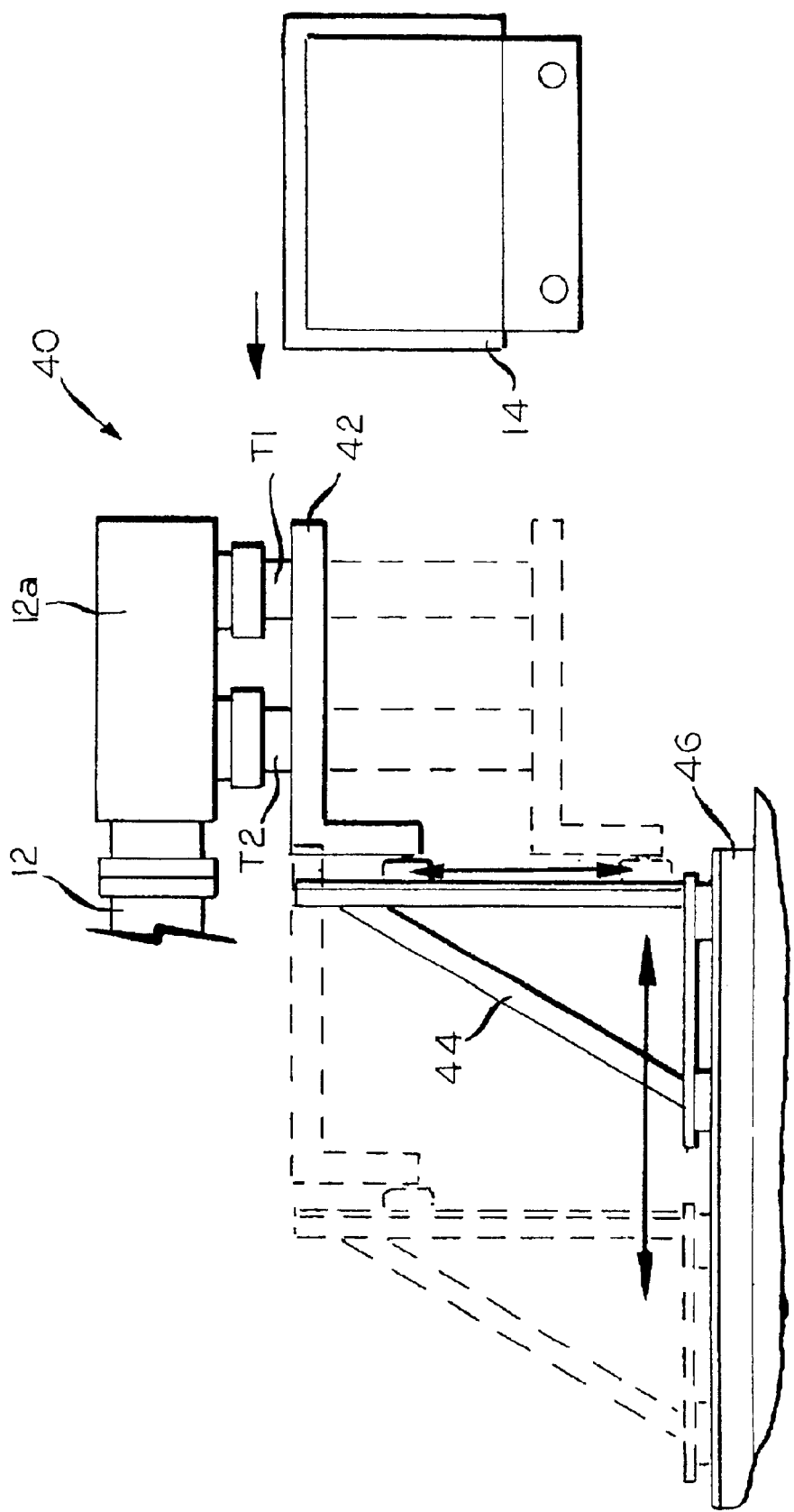
FIG. 5 is a schematic elevation view of a device that may usefully be employed in certain situations in conjunction with apparatus according to FIGS. 1–4.

FIG. 5 illustrates a device, generally identified by reference numeral 40, for capturing the extruded tubes T1, T2 before they are grasped by the mold sets 14, 16, and for securely engaging the extruded tubes T1, T2 while the mold sets 14, 16 are closing around them. This may be useful, for example, to stretch the extruded tubes T1, T2 to reduce the wall thickness thereof from their extruded thicknesses, or to control the positions of the extruded tubes T1, T2, which are otherwise free to swing relative to the mold sets 14, 16, while they are being engaged by the mold sets 14, 16. This factor becomes more important as the lengths of the tubes engaged by the mold sets 14, 16 increases. In any case, the device 40 includes a vertically reciprocal clamp 42 that grasps the tubes T1, T2 at locations just below the extruder head 12a. The clamp 42 then moves downwardly on a frame 44 to a position below the position at which the mold set 14 or 16, as the case may be, grasps the tubes T1, T2. The clamp 42 then releases the extruded tubes T1, T2, and the frame 44 is moved rearwardly on slides 46 to a position where the clamp 42 is out of alignment with the tubes T1, T2. Then, the clamp 42 is moved upwardly to its extruded tube grasping position to grasp subsequent lengths of the tubes T1, T2, and the frame 44 is then moved inwardly, after opening the clamp 42, to permit the clamp 42 to grasp such lengths after the mold set 14 or 16 has moved out of its tube grasping position.

Although the best mode contemplated by the inventors for carrying out the present invention as of the filing date hereof has been shown and described herein, it will be apparent to those skilled in the art that suitable modifications, variations and equivalents may be made without departing from the scope of the invention, such scope being limited solely by the terms of the following claims and the legal equivalents thereof.

We claim:

1. Apparatus for blow molding containers from a thermoplastic material, said apparatus comprising:

an extruder for continuously extruding at least one tube of the thermoplastic material downwardly along a vertical axis;

a first mold, said first mold having a first set of mold halves that open and close relative to each other to define, when closed, a first mold cavity;

a second mold, said second mold having a second set of mold halves that open and close relative to each other to define, when closed, a second mold cavity;

means for moving said first mold along a first closed path to present said first mold at a first position to engage, when open, a first finite length of the thermoplastic tube for blowing of the first finit length of the thermoplastic tube into a container as the first mold moves from the first position to a second position of the first closed path; and means for moving said second mold along a second closed path to present said second mold at the first position to engage, while open, a second finite length of the thermoplastic tube for blowing the second finite length of the thermoplastic tube into a container as the second mold moves along the second closed path to a second position of the second closed path;

the first position of the first closed path and the first position of the second closed path being the same, and the second position of the first closed path and the second position of the second closed path being the same, said apparatus comprising no more than two molds.

2. Apparatus for blow molding containers from a thermoplastic material, said apparatus comprising:

an extruder for continuously extruding at least one tube of the thermoplastic material downwardly along a vertical axis;

a first mold, said first mold having a first set of mold halves that open and close relative to each other to define, when closed, a first mold cavity;

a second mold, said second mold having a second set of mold halves that open and close relative to each other to define, when closed, a second mold cavity;

means for moving said first mold along a first closed path to present said first mold at a first position to engage, when open, a first finite length of the thermoplastic tube for blowing of the first finite length of the thermoplastic tube into a container as the first mold moves from the first position to a second position of the first closed path;

means for moving said second mold along a second closed path to present said second mold at the first position to engage, while open, a second finite length of the thermoplastic tube for blowing the second finite length of the thermoplastic tube into a container as the second mold moves along the second closed path to a second position of the second closed path;

the first position of the first closed path and the first position of the second closed path being the same, and the second position of the first closed path and the second position of the second closed path being the same; and a single in-mold labeling device positioned being beneath the extruder to introduce labels into the first and second molds as the first and second molds proceed along the first closed path and the second closed path, respectively.

3. Apparatus according to claim 1 and further comprising:

a single container take-out device for successively removing blown containers from the first mold and the second mold at the second position.

4. Apparatus according to claim 3 wherein:

the second position is horizontally spaced from the first position.

5. Apparatus according to claim 4 wherein:

the second position and the first position are at the same elevation.

6. Apparatus according to claim 1 wherein:

the first closed path includes a first leg extending outwardly in a first direction and downwardly from the first position; and the second closed path includes a first leg extending outwardly in a direction opposed to the direction of the first leg of the first closed path and downwardly.

7. Apparatus according to claim 2 and further comprising:

a single container take-out device for successively removing blown containers from the first mold and the second mold at the second position.

8. Apparatus according to claim 7 wherein:

the second position is horizontally spaced from the first position.

9. Apparatus according to claim 8 wherein:

the second position and the first position are at the same elevation.

10. Apparatus according to claim 2 wherein:

the first closed path includes a first leg extending outwardly in a first direction and downwardly from the first position; and the second closed path includes a first leg extending outwardly in a direction opposed to the direction of the first leg of the first closed path and downwardly.

11. A method of blow molding containers from a thermoplastic material, the method comprising:

substantially continuously extruding a thermoplastic matrial downwardly along a vertical axis;

engaging a first finite length of the thermoplastic material in a first mold set at a first position of the first mold set;

moving the first mold set in a closed path having a first leg in which the first mold set is moved from the first position outwardly in a first direction and downwardly;

engaging a second finite length of the extruded thermoplastic material in a second mold at the position where the first finite length of the extruded thermoplastic material was engaged by the first mold set after the first mold set has moved along the first leg of its first dosed path;

moving the second mold set along a second closed path having a first leg extending outwardly in a second direction from the first position and downwardly, the second direction being opposed to the first direction;

removing the blown containers from the first mold set at a second position of the first dosed path, the second position being spaced horizontally away from the first position; and thereafter removing the blown containers from the second mold set at a second position of the second mold set, the second position of the second mold set being the same as the second position of the first mold set;

the method comprising using no more than two molds.

12. A method of blow molding containers from a thermoplastic material, the method comprising:

substantially continuously extruding a thermoplastic material downwardly along a vertical axis;

engaging a first finite length of the thermoplastic material in a first mold set at a first position of the first mold set;

moving the first mold set in a dosed path having a first leg in which the first mold set is moved from the first position outwardly in a first direction and downwardly;

engaging a second finite length of the extruded thermoplastic material in a second mold at the position where the first finite length of the extruded thermoplastic material was engaged by the first mold set after the first mold set has moved along the first leg of its first dosed path;

moving the second mold set along a second dosed path having a first leg extending outwardly in a second direction from the first position and downwardly, the second direction being opposed to the first direction;

removing the blown containers from the first mold set at a second position of the first dosed path, the second position being spaced horizontally away from the first position;

thereafter removing the blown containers from the second mold set at a s cond position of the second mold set, the second position of the s cond mold set being the same as the second position of the first mold set; and applying labels, in sequence, to interiors of the first mold set and the second mold set, the labels being applied to the interior of the first mold set at the first position of the first mold set and being applied to the interiors of the second mold set at the first position of the second mold set.

13. Apparatus for blow molding containers from a thermoplastic material, said apparatus comprising:

an extruder for continuously extruding at least one tube of the thermoplastic material downwardly along a vertical axis;

a first mold, said first mold having a first set of mold halves that open and close relative to each other to define, when closed, a first mold cavity;

a second mold, said second mold having a second set of mold halves that open and close relative to each other to define, when closed, a second mold cavity;

means for moving said first mold along a first closed path to present said first mold at a first position to engage, when open, a first finite length of the thermoplastic tube for blowing of the first finite length of the thermoplastic tube into a container as the first mold moves from the first position to a second position of the first closed path;

means for moving said second mold along a second dosed path to present said second mold at the first position to engage, while open, a second finite length of the thermoplastic tube for blowing the second finite length of the thermoplastic tube into a container as the second mold moves along the second closed path to a second position of the second closed path;

the first position of the first dosed path and the first position of the second dosed path being the same, and the second position of the first dosed path and the second position of the second dosed path being the same; and means separate from the first mold set and the second mold set for grasping the extruded tube and for moving downwardly before a finite length of the extruded thermoplastic tube is grasped by the first mold set or the second mold set, the means for grasping releasing the extruded thermoplastic tube and withdrawing from the thermoplastic tube after the finite length of the thermoplastic tube has been grasped by the first mold set or the second mold set.

14. A method of blow molding containers from a thermoplastic material, the method comprising:

substantially continuously extruding a thermoplastic material downwardly along a vertical axis;

engaging a first finite length of the thermoplastic material in a first mold set at a first position of the first mold set;

moving th first mold set in a dosed path having a first leg in which the first mold set is moved from the first position outwardly in a first direction and downwardly;

engaging a second finite length of the extruded thermoplastic material in a second mold at the position where the first finite length of th extruded thermoplastic material was engaged by the first mold set after the first mold set has moved along the first leg of its first closed path;

moving the second mold set along a second closed path having a first leg extending outwardly in a second direction from the first position and downwardly, the second direction being opposed to the first direction;

removing the blown containers from the first mold set at a second position of the first closed path, the second position being spaced horizontally away from the first position; and thereafter removing the blown containers from the second mold set at a second position of the second mold set, the second position of the second mold set being the same as the second position of the first mold set;

grasping the extruded thermoplastic tube by a device separate from the first mold means and the second mold means and before the first finite length of the thermoplastic tube or the second finite lengths of thermoplastic tube is grasped by the first mold means or the second mold means;

moving the device downwardly;

grasping the first finite length of the thermoplastic tub or the second finite lengths of the thermoplastic tube while it is engaged by the device;

releasing the thermoplastic tube by the device; and withdrawing the device from the thermoplastic tube to permit the first finite length of the thermoplastic tube in th first mold means or the second finite length of thermoplastic tube in the second mold means, as the case may be, to move along the first closed path or the second dosed path.

* * * * *

UNITED STATES PATENT AND TRADEMARK OFFICE
CERTIFICATE OF CORRECTION

PATENT NO. : 6,730,257 B2
DATED : May 4, 2004
INVENTOR(S) : Thomas J. Krall and Gregory A. Geisinger It is certified that error appears in the above-identified patent and that said Letters Patent is hereby corrected as shown below:

Column 5,
Lines 47 and 51, "dosed" should be -- closed --.
Line 55, "finit" should be -- finite --.

Column 6,
Lines 1 and 2, "dosed" should be -- closed --.
Lines 14, 23 and 31, "dosed" should be -- closed --.

Column 7,
Lines 10 and 11, "mat rial" should be -- material --.
Lines 22, 29, 44, 51, 54 and 59, "dosed" should be -- closed --.
Lines 63 and 64, "s cond" should be -- second --.

Column 8,
Lines 23, 30, 31, 32 and 51, "dosed" should be -- closed --.
Line 51 and 56, "th" should be -- the --.

Column 10,
Line 1, "tub" should be -- tube --.
Lines 7 and 9, "th" should be -- the --.

Signed and Sealed this

Thirtieth Day of May, 2006

JON W. DUDAS
*Director of the United States Patent and Trademark Office*